United States Patent [19]
Lhotak et al.

[11] Patent Number: 5,761,850
[45] Date of Patent: Jun. 9, 1998

[54] GARAGE DOOR OPERATOR HAVING VIBRATION DAMPER FOR NOISE REDUCTION

[75] Inventors: Roger W. Lhotak, Hanover Park; Kenneth J. Dombrowski, Wheaton, both of Ill.

[73] Assignee: The Chamberlain Group, Inc., Elmhurst, Ill.

[21] Appl. No.: 641,273

[22] Filed: Apr. 30, 1996

Related U.S. Application Data

[63] Continuation of Ser. No. 546,624, Oct. 23, 1995, Pat. No. 5,581,112, which is a continuation of Ser. No. 418,866, Apr. 7, 1995, abandoned, which is a continuation of Ser. No. 261,819, Jun. 17, 1994, abandoned.

[51] Int. Cl.$^6$ .................................................. E05F 11/00
[52] U.S. Cl. ........................... 49/360; 49/362; 49/200; 464/87; 464/81; 464/180
[58] Field of Search ........................ 49/360, 362, 199, 49/200; 160/189, 188; 464/87, 92, 81, 80, 180; 248/638, 674; 403/220, 223, 225, 228; 267/153, 141

[56] References Cited

U.S. PATENT DOCUMENTS

| | | | |
|---|---|---|---|
| 2,884,772 | 5/1959 | Amberg | 464/81 |
| 2,969,656 | 1/1961 | Reuter | 464/87 |
| 3,475,923 | 11/1969 | Spence | 464/81 |
| 3,727,429 | 4/1973 | Dawney | 464/80 |
| 4,425,813 | 1/1984 | Wadensten | 248/638 |
| 4,587,863 | 5/1986 | Wadensten | 248/638 |
| 4,648,579 | 3/1987 | Wilson | 248/638 |
| 4,885,872 | 12/1989 | Chang et al. | 49/362 |
| 4,943,261 | 7/1990 | Smith | 464/81 |
| 5,010,688 | 4/1991 | Dombrowski et al. | 49/362 |
| 5,221,869 | 6/1993 | Williams et al. | 49/199 X |
| 5,505,423 | 4/1996 | Kusijanovic | 248/674 |

OTHER PUBLICATIONS

Parts list for Stanley garage door operator, published before Jul. 17, 1993.

Two Photographs of Stanley garage door operator sold in the United States before Jul. 17, 1993.

*Primary Examiner*—Anthony Knight
*Assistant Examiner*—Curtis A. Cohen
*Attorney, Agent, or Firm*—Fitch, Even, Tabin & Flannery

[57] ABSTRACT

A garage door operator having reduced noise output during operation includes a head unit having a housing. A motor mount is connected to the housing to support an electric motor. A vibration damper is interposed between the motor mount and the electric motor to reduce noise radiated from the housing when the electric motor is energized to drive a garage door up and down.

14 Claims, 5 Drawing Sheets

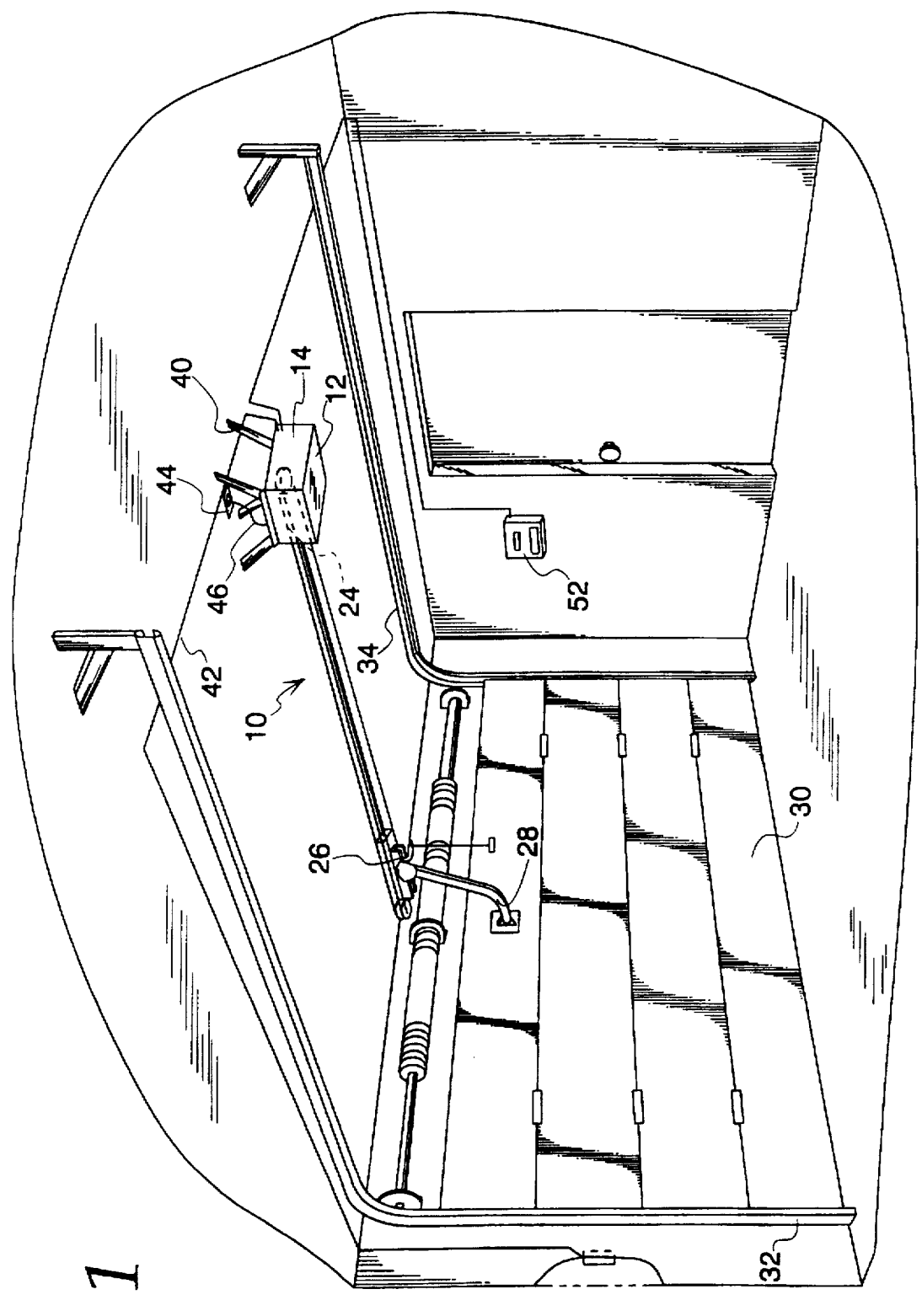
Fig. 1
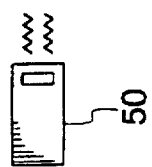

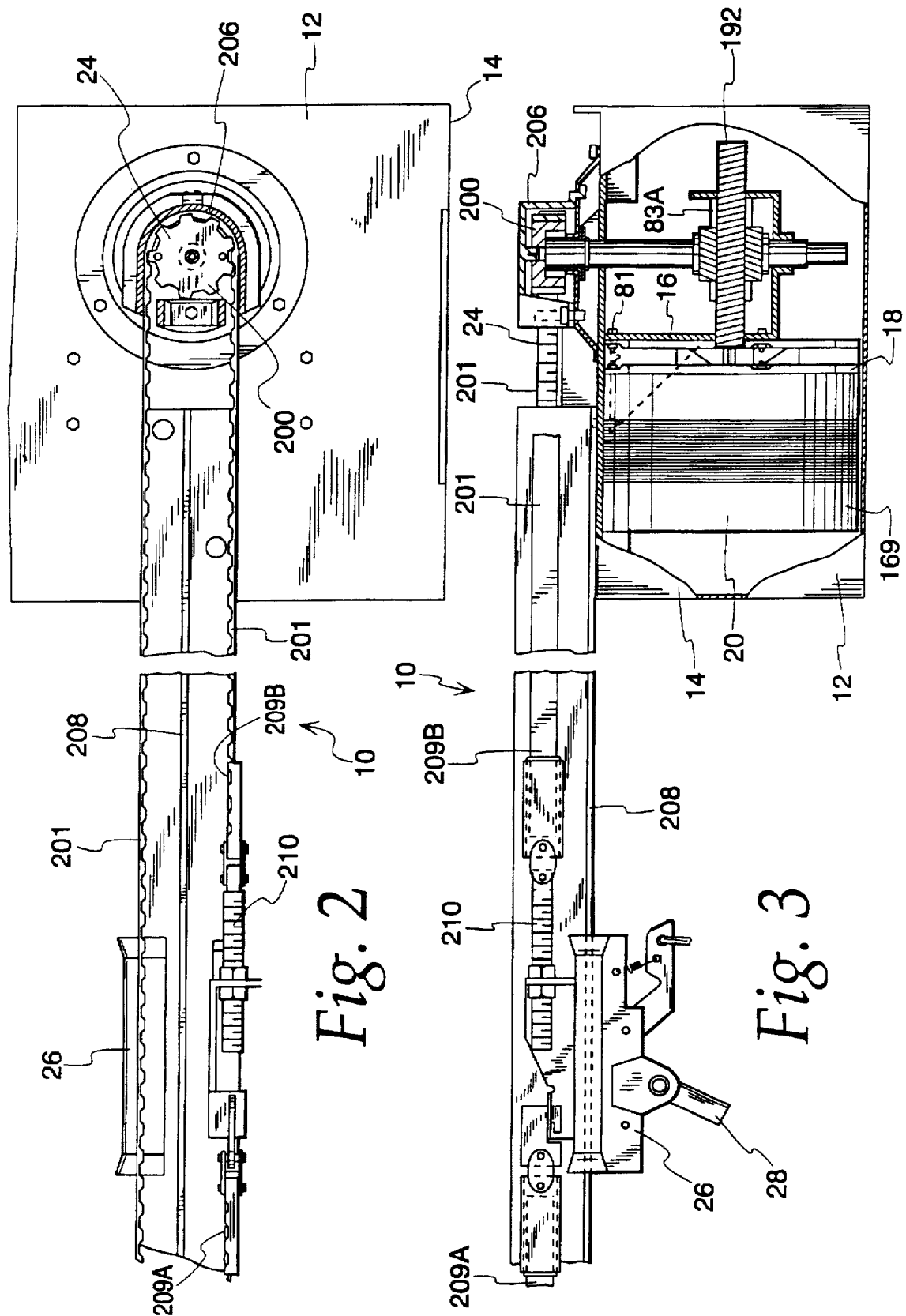

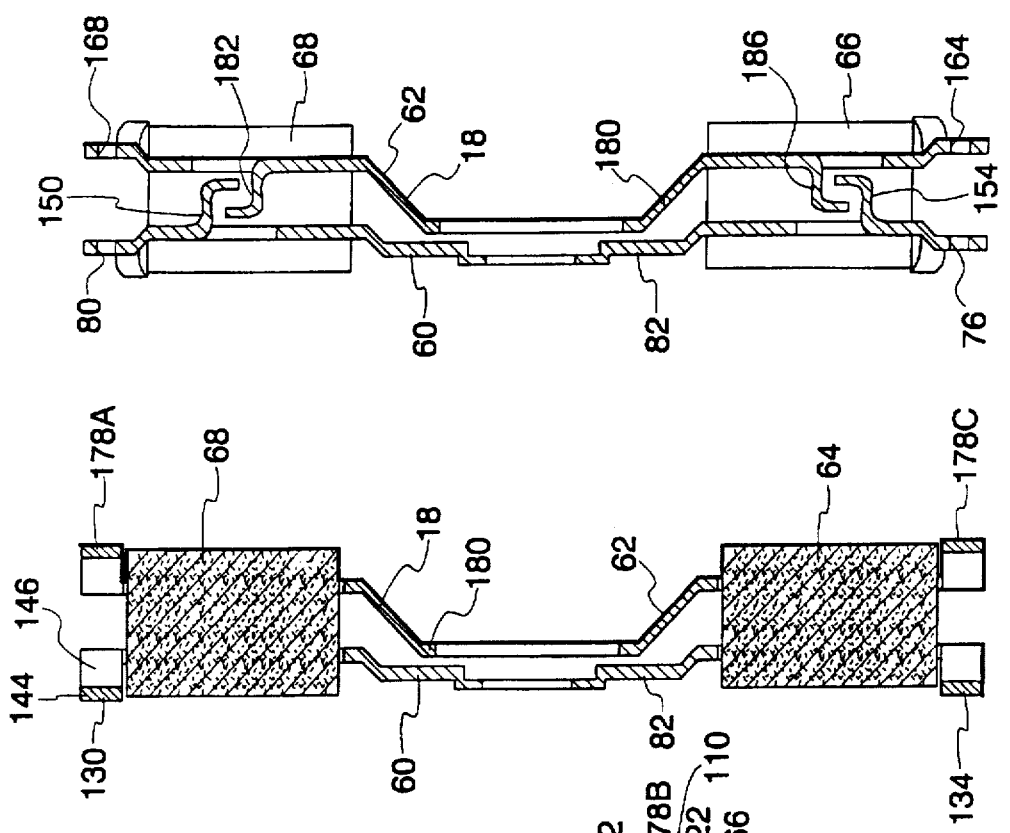
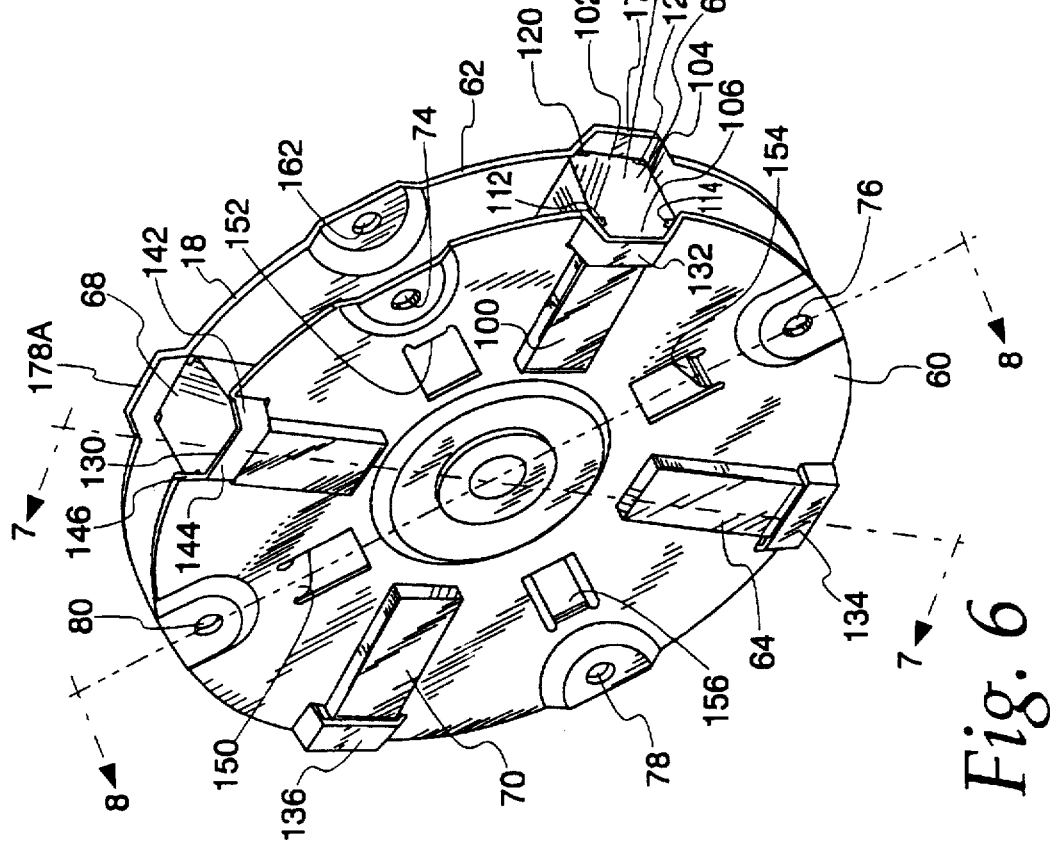

GARAGE DOOR OPERATOR HAVING VIBRATION DAMPER FOR NOISE REDUCTION

CROSS REFERENCE TO RELATED APPLICATIONS

This is a continuation of U.S. application Ser. No. 08/546,624, filed Oct. 23, 1995 U.S. Pat. No. 5,581,112, which is a continuation of U.S. application Ser. No. 08/418,866, filed Apr. 7, 1995 and now abandoned, which is a continuation of U.S. application Ser. No. 08/261,819, filed Jun. 17, 1994 and now abandoned.

BACKGROUND OF THE INVENTION

The invention relates in general to garage door operators and, in particular, to a garage door operator having a vibration damper for reduction of vibration transmission to a head unit housing in order to reduce radiated noise during operation.

One of the problems associated with garage door operators is that they are often noisy in operation, which noise would be desirable to reduce. Such noise is typically transmitted from the motor through a motor mount to the walls of the head unit housing which may reverberate or further transmit vibration through a support to the ceiling of the garage. The noise energy then being conducted through a solid may be radiated through substantial portions of the house awakening people and generally being an annoyance.

In the past other approaches have been made in an attempt to reduce the amount of noise generated by a garage door operator. For instance, motor mounting systems may include elastomeric grommets between the motor mount and the housing or the like in an attempt to partially isolate the vibration of the electric motor through the motor mount from the housing. The problem with such approaches using grommets and the like is that the threaded fasteners which extend through the grommets still provide excellent vibration conduction paths only being damped slightly by the grommets. Such prior art systems, which employed grommets or damping materials between the motor mount and the housing unit yielded inadequate damping because the displacement due to the vibration particularly during acceleration or deceleration of the garage door exceeded the elastic compression limits of the grommets and resulted in good coupling of the vibration from the motor into the motor mount and then the housing radiating large amounts of noise. A portion of the noise energy or vibration energy also was transmitted directly to the motor mount via the threaded fastener with minimal damping occurring from the grommet.

Other noise problems that have been associated with garage door operators in the past resulted from the vibration or slapping motion of the chain as it is driven by the electric motor. The chain was typically connected in a partial or complete loop and to a trolley, which in turn releasably connected the drive chain to a door arm for raising and lowering a garage door. Such chain noise problems, however, have been alleviated by a plastic belt garage door operator, which is disclosed in two patents assigned to the assignee of the present application. The plastic belt garage door operator is disclosed in U.S. Pat. No. 4,885,872 to Chang et al. Chang et al. disclose a garage door operator having a head unit including a drive wheel having a plurality of teeth thereon connected to a plastic belt having a toothed surface for engagement with regularly spaced teeth 62 on the drive wheel. The use of the plastic belt, which in effect includes a self-damping structure, reduce the amount of noise generated by the belt assembly while the system is in operation. A modified system of similar type is disclosed in U.S. Pat. No. 5,010,688 to Dombrowski et al. That patent discloses a garage door operator having a toothed plastic drive belt for reduction in noise generated while the garage door operator is running.

What is needed, then, is a garage door operator having reduced noise radiation from the housing of the head unit in order to reduce the noise level of the garage door operator during operation.

SUMMARY OF THE INVENTION

A garage door operator embodying the present invention comprises an apparatus for opening and closing a garage door having a head unit. The head unit includes a sheet metal housing, typically in the shape of a rectangle, having a stamped motor mount attached thereto by a plurality of threaded fasteners. The sheet metal housing may be hung from an overhead or ceiling portion of a garage. A vibration damper comprising a first rigid stamped metal disc is connected to the motor mount. A second rigid metal disc is connected to an electric motor, the two discs are held in connection solely by one or more elastomers. When operating, the electric motor causes a garage door translation link, for instance including a chain, plastic belt or screw drive to be moved. The garage door translation link includes a speed reducing transmission that can move the chain, plastic belt or screw drive in either direction depending upon the direction in which the motor is running. A trolley or other releasable coupler and uncoupler is connected to the translation link. For instance the trolley may be connected to a plastic belt drive. A door operator arm is connected to the trolley and to a garage door to cause the garage door to go up and down when the motor is driven. The use of relatively thick elastomers in a vibration damper between the motor mount and the electric motor allows for significant noise reduction in the amount of noise radiated or transmitted from the housing of the head unit.

It is a principal aspect of the present invention to provide a garage door operator having a low noise characteristic provided by a vibration damper which uncouples the electric motor vibrationally from the housing of the head unit.

BRIEF DESCRIPTION OF THE DRAWINGS

FIG. 1 is a perspective view of an interior of a garage having portions broken away and including a garage door operator embodying the present invention;

FIG. 2 is a top elevational view of a portion of the garage door operator shown in FIG. 1 showing details of a portion of a head unit, a drive sprocket, a T-rail connected to the head unit and a plastic drive belt;

FIG. 3 is a side elevational view of the garage door operator shown in FIG. 1 and having a portion broken away and portions shown partially in section;

FIG. 6 is an assembled view of the vibration damper;

FIG. 7 is a sectional view of the assembled vibration damper shown in FIG. 6 and taken substantially along line 7—7 of FIG. 6; and FIG. 8 is a sectional view of the assembled vibration damper shown in FIG. 6 and taken substantially along line 8—8 of FIG. 6.

DETAILED DESCRIPTION OF THE PREFERRED EMBODIMENT

Figure 4:
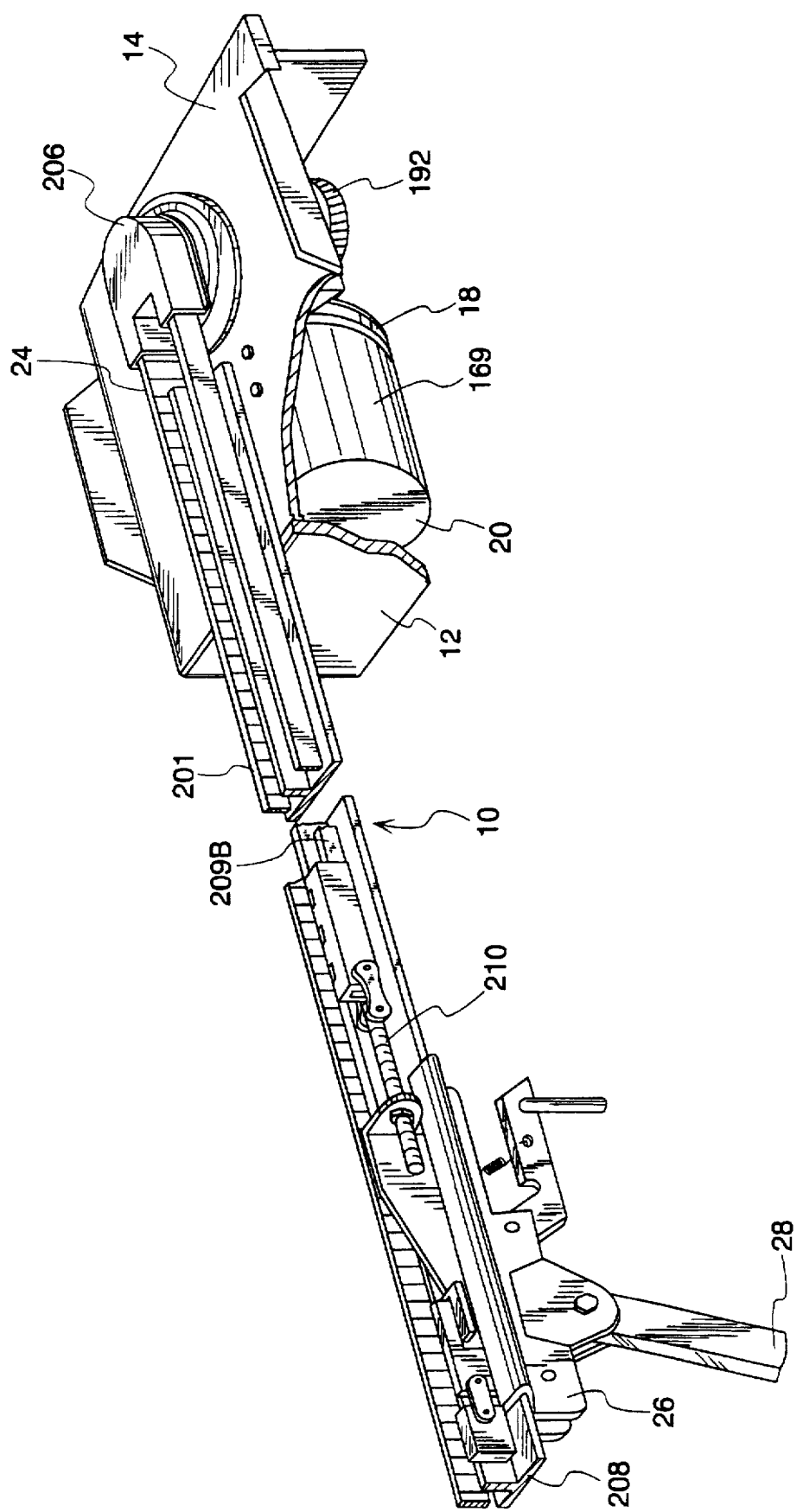
FIG. 4 is a perspective view of a portion of the garage door operator shown in FIGS. 2 and 3.

Referring now to the drawings and especially to FIG. 1, apparatus for opening and closing a garage door, a garage door operator, is shown therein and generally identified by numeral 10. The garage door operator 10 includes a head unit 12 having a housing 14 comprised of sheet metal. A motor mount or motor support bracket 16 is positioned within the housing 14 and supports a vibration damper 18, which in turn supports a cylindrical alternating current electric motor 20. A garage door transmission link 24 is connected to the electric motor 20 to be driven thereby and imparts mechanical energy to means for selectively coupling and uncoupling a door arm to the garage door translation link, said coupling and uncoupling means, in this embodiment, comprising a trolley 26. A garage door arm 28 is connected to the trolley 26 to drive a segmented garage door 30 along a pair of rails 32 and 34.

In particular, the head unit 12, having the electric motor therein, comprises the substantially rectangular sheet metal housing 14 connected by a plurality of brackets 40 to a ceiling 42 of a garage. The head unit 12 is energized from a suitable source of electrical energy 44, for instance an A.C. outlet via an electrical cord 46. When a transmitter 50 or a wall switch 52 are actuated, electrical energy is fed to the electric motor 20 to open and close the garage door.

Figure 5:
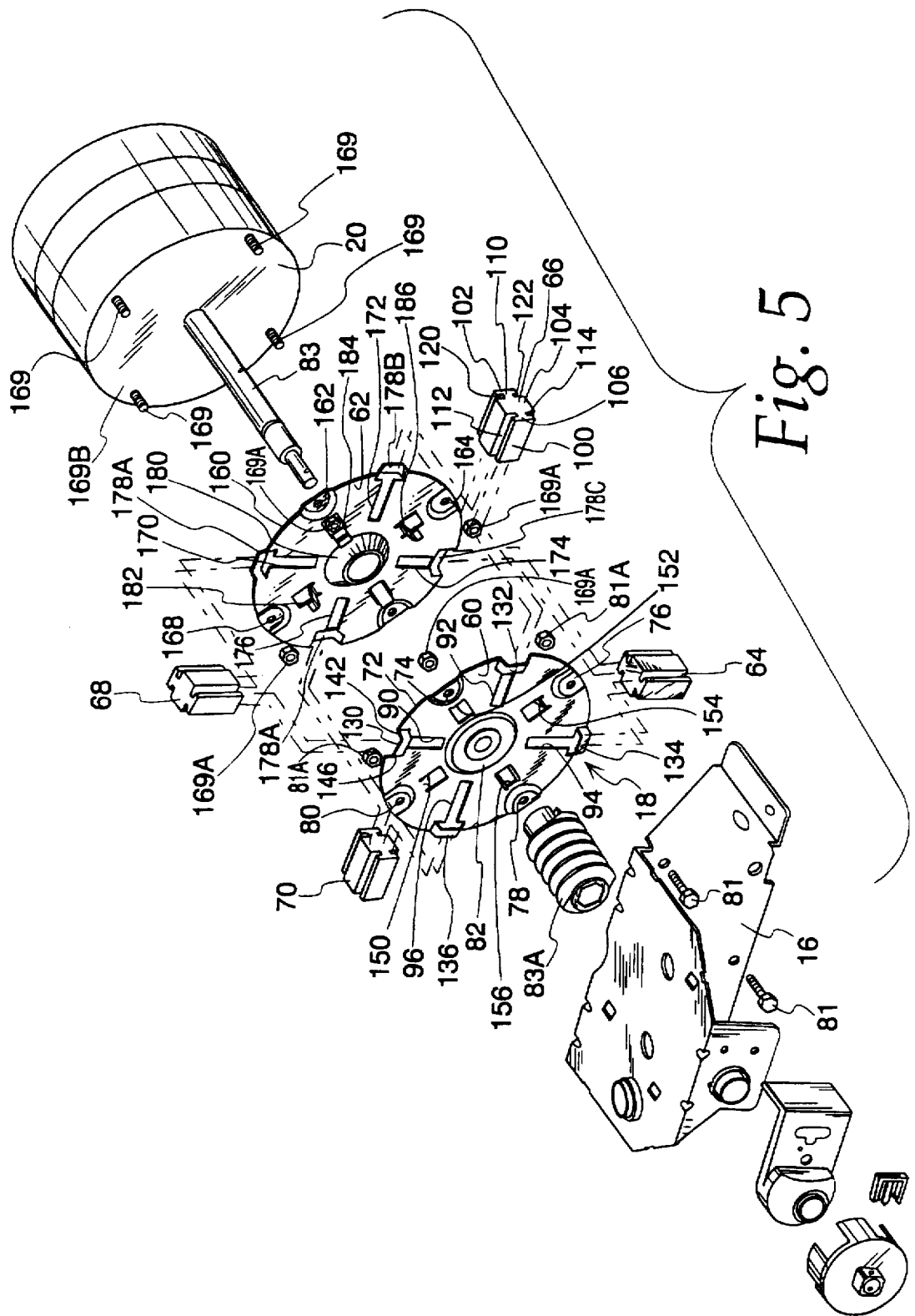
FIG. 5 is an exploded perspective view of a motor mount, a vibration damper and a motor of the garage door operator shown in FIG. 1.

Referring now to FIGS. 5, 6, 7 and 8, details of the vibration damper 18 are shown therein. The vibration damper 18 generally comprises a stamped rigid motor mount disc 60 for secure connection to the motor mount 16, a stamped rigid motor disc 62 for secure connection to the electric motor 20, and four resilient, slotted, extended and cut 45 Shore A neoprene elastomer blocks 64, 66, 68 and 70 that pass the Underwriters Laboratories 94HB flame specifications. The elastomer blocks vibrationally uncouple the motor mount 16 and disc 60 from the electric motor 20 and the disc 62. The elastomer blocks are relatively soft and only need to withstand normal loads, but not impact loads to provide good vibration isolation. Impact loads are handled by compression and tension stops as set forth hereafter. The rigid motor mount disc 60 has a substantially circular periphery 72 with a plurality of threaded fastener apertures 74, 76, 78 and 80 spaced thereabout for connection via threaded fasteners 81 and nuts 81a to the motor mount 16. The fastener apertures 74 through 80 are spaced at 90° intervals about the periphery 72. A central cone-shaped section 82 can accept a motor spindle 83 coupled to a worm gear 83a and is used to provide an internal compressional stop for the vibration damper 18. Spaced between respective pairs of the apertures 74 through 80 are slots 90, 92, 94 and 96 which accept the slotted elastomer blocks.

Each of the slotted elastomer blocks is identical to the others. The exemplary slotted elastomer block 66 includes a motor mount ear section 100, a motor ear section 102, a center body section 104 and a body motor mount section connector 106 with a body motor section connector 110 therebetween. The body block 104, bridging section 106 and motor mount section 100, define a pair of open, substantially rectangular slots 112 and 114, which are respectively connected to the sides defining the slot 92. Likewise, the motor ear 102, bridging section 110 and body block 104, together define slots 120 and 122 which are fitted to the disc 62. Each of the slots 90, 92, 94 and 96 has at its terminal end adjacent thereto a somewhat U-shaped bridging section, respectively numbered 130, 132, 134 and 136. Each of U-shaped members is identical and is used to support and guide the elastomers when they are being assembled with the rigid discs. The U-shaped members provide structural integrity to the disc 60 and also prevent the elastomers from sliding out of engagement with the disc 60. It should be appreciated that, taking U-shaped member 130 as exemplary, the U-shaped member includes a pair of angled leg sections 146 and 142 joined by a center or bridging section 144. The disc 60 also includes four tang-type tension stops 150, 152, 154 and 156 which are formed during the stamping process from leaves of metal stamped away from the disc to define respective, substantially rectangular openings and extend toward the elastomer sections and are adapted to overlap with other tension stops in the disc 62 so that when a large force is applied in tension to vibration damper 18, such as an impact force, the discs 60 and 62 only can be pulled apart to the limit of their travel as provided by the tension stops.

Disc 62 is similar in many ways to disc 60 and is substantially circular in aperture, having a circular periphery 160. A plurality of threaded fastener openings 162, 164, 166 and 168 receive bolts 169 extending from a motor end bell 169b to which it is to be attached. The threaded fasteners and accompanying nuts 169a secure the disc 62 to the motor end bell 169b of the electric motor 20. Also included in the disc 62 is a plurality of rectangular slots 170, 172, 174 and 176 which are adapted to receive the motor mount sides of the blocks 64, 66, 68 and 70. The rectangular slots terminate in U-shaped supports 178a, 178b, 178c and 178d which provide disc rigidity while holding the elastomer blocks 64, 66, 68 and 70. The disc has a center or cone-shaped portion 180 which, in compressional engagement from an impact load, is brought into contact with the cone-shaped portion 82 of the disc 60 to prevent further compression and damage to the elastomer blocks. Likewise, a plurality of tang-type tension stops 182, 184, 186 and 188 are adapted to overlap at hook portions with the tangs 150, 152, 154 and 156 to prevent the tensional forces generated by an impact load from separating the two discs to the point where damage could occur to the elastomer blocks. However, it should be appreciated that in normal operation, the elastomer blocks form the only mechanical connection between the discs 60 and 62 to provide excellent vibration isolation between them.

During operation, the electric motor 20 is energized. Vibration from the electric motor 20, the transmission link 24, trolley 26, garage door arm 28 and the garage door 30 is uncoupled from the motor mount 16 by the vibration damper 18. The electric motor 20 drives the transmission link 24 which includes the worm gear 83a. The worm gear 83a drives a spur gear 192 which drives a toothed sprocket 200 about which a toothed plastic drive belt 201 is engaged. The toothed sprocket 200 is covered by a sprocket cap 206 and the drive belt extends along a T-rail 208. The combination of the toothed sprocket 200 and the plastic drive belt 201 provides reduced noise as compared to chain drive garage door operators. A pair of ends 209a and 209b of the toothed plastic drive belt 201 are connected to the trolley 26 via a plastic drive belt coupler 210 of the type shown in U.S. Pat. No. 4,885,872, the teachings of which are incorporated herein. When the sprocket 200 is driven by the electric motor 20, the toothed plastic drive belt 201 moves the trolley 26 along the T-rail 208 toward or away from the head unit 12. Such longitudinal movement of the trolley 26 causes the segmented garage door arm 28 to raise or lower the garage door 30. The axial and torsional loads from operation of the worm gear 83a are transferred through the damper so that under normal start-up and operating conditions the compression stops and the tension stops do not make contact.

It may be appreciated that substantial isolation is provided through the vibration damper 18 between the electric motor 20 and transmission link 24 and the housing 14 itself. Unlike prior art systems which employed grommets or damping materials between the motor mount and the housing unit and resulted in inadequate damping because the displacement due to the vibration exceeded the elastic compression limits of the grommets and resulted in good coupling of the vibration from the motor which was passing through the mount into the housing unit and thereby caused large amounts of noise. In addition, such prior art units provided much less noise reduction than the present invention because those units included metal fasteners such as bolts which extended through the grommets and provided excellent vibration conduction paths to the motor mount and the housing. The present invention provides superior noise reduction because during normal operation the only connection between the electric motor 20 and the motor mount 16 is through the elastomer blocks 64, 66, 68 and 70.

While there has been illustrated and described a particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus, for opening and closing a garage door, comprising:

a motor mount;

a vibration damper connected to the motor mount;

an electric motor which includes a motor body and a motor spindle extending from the motor body;

a garage door transmission link, the motor spindle extending through the vibration damper and drivingly coupled to the garage door transmission link, the vibration damper positioned between the electric motor body and the transmission link, the vibration damper including a rigid motor mount element affixed to the motor mount, a rigid motor element connected to the electric motor body, at least one unitary elastomeric element between the rigid motor mount element and the rigid motor element coupling the rigid motor mount element with the rigid motor element without an additional fastener attached to the unitary elastomeric element, the unitary elastomeric element being the only connection between the rigid motor mount element and the rigid motor element, the unitary elastomeric element damping the vibration from the electric motor to the motor mount and transmission link; and uncoupling means for selectively coupling and uncoupling a door arm to said garage door transmission link.

2. The apparatus for opening and closing a garage door according to claim 1, further comprising a housing supporting the motor mount and enclosing the motor mount, the electric motor and a speed reducing transmission, the vibration damper damping the vibration from the electric motor to the housing.

3. Apparatus for opening and closing a garage door according to claim 1, wherein the uncoupling means comprises a trolley.

4. The apparatus for opening and closing a garage door according to claim 1, further comprising a plurality of unitary elastomeric elements positioned between the rigid motor element and the rigid motor mount element.

5. The apparatus for opening and closing a garage door according to claim 4, wherein the unitary elastomeric elements are equidistantly spaced about the rigid motor mount element and the rigid motor element.

6. The apparatus for opening and closing a garage door according to claim 1, wherein one of said rigid elements further comprises a compression stop for limiting travel of the rigid elements toward each other under a compressional stress.

7. The apparatus for opening and closing a garage door according to claim 4, wherein one of said rigid elements comprises a tension stop for limiting travel of the rigid elements away from each other under a tension stress.

8. The apparatus for opening and closing a garage door, comprising:

a motor mount;

a vibration damper connected to the motor mount;

an electric motor which includes a motor body and a motor spindle extending from the motor body;

a garage door transmission link, the motor spindle extending through the vibration damper and drivingly coupled to the garage door transmission link, the vibration damper positioned between the electric motor body and the transmission link, the vibration damper including a rigid motor mount element affixed to the motor mount, a rigid motor element connected to the electric motor body, a coupling which connects the rigid motor mount element and rigid motor element, the coupling consisting essentially of at least one unitary elastomeric element which couples the rigid motor mount element and rigid motor element without an additional fastener attached to the unitary elastomeric element, the vibration damper damping the vibration from the motor to the motor mount and transmission link; and uncoupling means for selectively coupling and uncoupling a door arm to said garage door transmission link.

9. The apparatus for opening and closing a garage door according to claim 8, further comprising a plurality of unitary elastomeric elements positioned between the rigid motor element and the rigid motor mount element.

10. The apparatus for opening and closing a garage door according to claim 8, wherein one of said rigid elements further comprises a compression stop for limiting travel of the rigid elements toward each other under a compressional stress.

11. The apparatus for opening and closing a garage door according to claim 9, wherein one of said rigid elements comprises a tension stop for limiting travel of the rigid elements away from each other under a tension stress.

12. The apparatus for opening and closing a garage door according to claim 10, wherein one of said rigid elements comprises a tension stop for limiting travel of the rigid elements away from each other under a tension stress.

13. Apparatus for opening and closing a garage door, comprising:

a motor mount;

a vibration damper connected to the motor mount;

an electric motor which includes a motor body and a motor spindle extending from the motor body;

a garage door transmission link, the motor spindle extending through the vibration damper and drivingly coupled to the garage door transmission link, the vibration damper positioned between the electric motor body and the transmission link, the vibration damper including a rigid motor mount element affixed to the motor mount, a rigid motor element connected to the electric motor body, a plurality of unitary elastomeric elements positioned between the rigid motor element and the rigid motor mount element coupling the rigid motor mount element with the rigid motor element without an additional fastener attached to the unitary elastomeric elements and being the only connections between the rigid motor mount element and the rigid motor element, one of said rigid elements including a compression stop for limiting travel of the rigid elements toward each other under a compressional stress the unitary elastomeric elements damping the vibration from the motor to the motor mount and transmission link; and uncoupling means for selectively coupling and uncoupling a door arm to said garage door transmission link.

14. The apparatus for opening and closing a garage door according to claim 13, wherein one of said rigid elements comprises a tension stop for limiting travel of the rigid elements away from each other under a tension stress.

* * * * *